Dec. 4, 1951  J. C. SMITH  2,577,436
TRAP FOR FLYING INSECTS
Filed Nov. 26, 1947
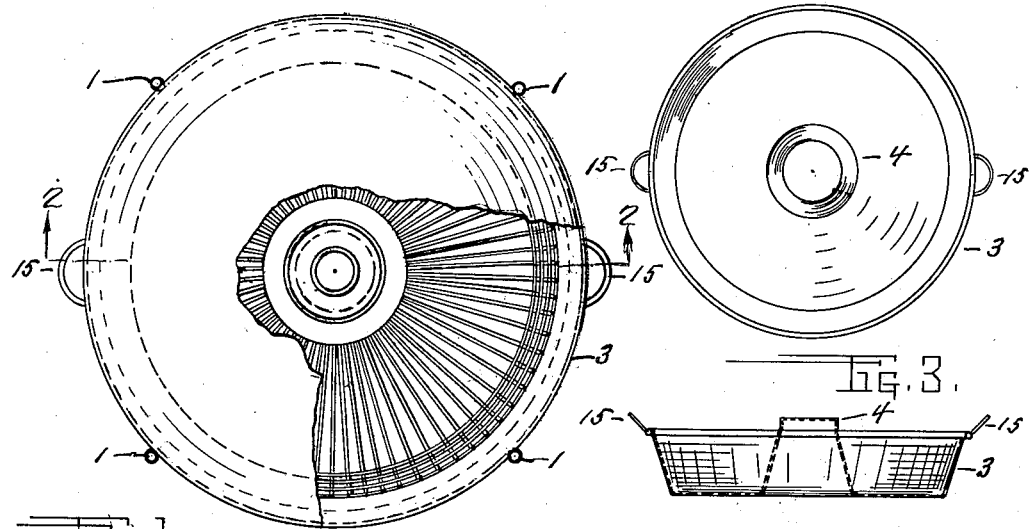
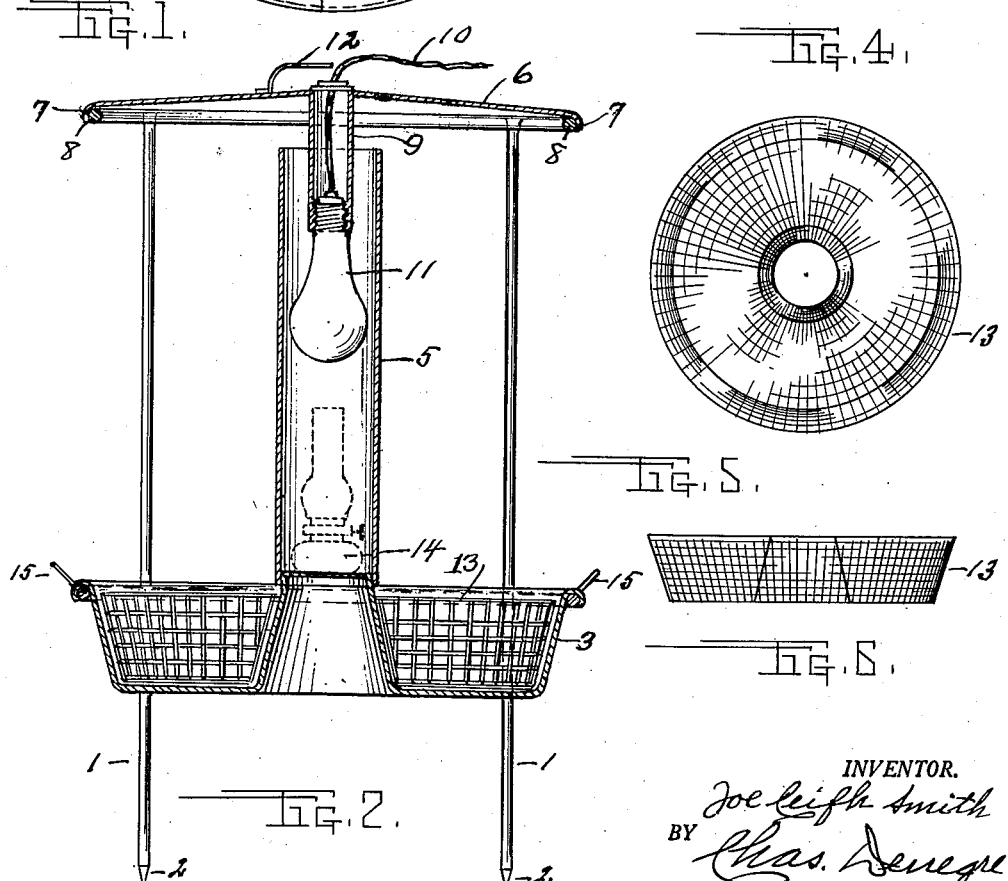
INVENTOR.
Joe Leigh Smith
BY Chas. Denegre
Attorney.

Patented Dec. 4, 1951

2,577,436

UNITED STATES PATENT OFFICE 2,577,436

TRAP FOR FLYING INSECTS

Joe Ceifh Smith, Bibb County, Ala.

Application November 26, 1947, Serial No. 788,228

2 Claims. (Cl. 43—113)

This invention relates to a trap for catching and killing flying insects of various kinds. It is a well known fact that flying insects are attracted by a bright light during the night. The present invention is based on this known fact. It has for its main objects to provide such a trap that will be highly efficient for its purpose, cheap to manufacture, simple in structure, very durable, and easy to understand and use by unskilled labor. The problem of getting rid of flying insects that destroy growing crops is a serious one. The present invention will provide simple and highly effective means that will go a long way towards solving this difficult problem.

Other objects and advantages will appear from the drawing and description.

By referring to the drawing part of this application, it will be observed that Fig. 1 is a plan view of the trap, a portion of the cover being cut away; Fig. 2 is a vertical sectional view of the trap; Fig. 3 is a plan view of the pan of the trap; Fig. 4 is an elevational view of the pan; Fig. 5 is a plan view of the wire mesh strainer for use in the pan; and Fig. 6 is an elevational view of the strainer.

Similar reference numerals refer to similar parts throughout the several views.

Referring to the drawing in detail it will be seen that the device comprises four support legs 1 preferably made of stiff steel rods with pointed lower ends 2 adapted for insertion into the ground. Supported on the rods by spot welding or other means there is a pan 3 with a raised center portion 4 as a supporting base for a glass tube 5 that extends upward to near the top 6 that is substantially flat with a curved rim 7 adapted to fit removably and snugly over a rod ring 8 that is attached to the top ends of the rods. Supported in the center of the top and depending therefrom there is a socket 9 with electric wires 10 connected thereto for supplying current to a regular type light bulb 11 inserted in the socket. For convenience the top cover is provided with a handle 12. There is a wire mesh strainer 13 of a size to easily fit within the pan and be removable therefrom when the top cover is off of the trap. An ordinary oil lamp 14 is used in the trap when electric current is not available for use in the bulb. The metal pan is provided with integral handles 15 for lifting the assembled trap.

From the foregoing it will appear that in order to use the trap during the night it is placed with its legs sufficiently inserted in the earth to hold it in upright level position. Then some oil, such as kerosene or the like, is poured into the pan with the strainer therein. The light is turned on. In this condition, flying insects of various kinds will be attracted by the light and will fly towards it, strike the glass tube, be stunned, and fall into the oil in the pan and be killed or disabled. When a considerable quantity of insects accumulate in the oil in the pan the strainer is lifted out with insects therein. Thus the oil remains in the pan for continuous use until dissipated by evaporation.

The trap may be made of any material suitable for the purpose; also may be made in various sizes.

While I have shown and described the preferred embodiment of my invention, I do not wish to limit same to the exact and precise details of structure, but reserve the right to make all modifications and changes so long as they remain within the spirit and scope of the following claims.

Having described my invention I claim:

1. A flying insect trap of the class described comprising, four supporting metal legs having pointed bottom ends, a pan attached to and supported by the legs at a position spaced upwardly of the pointed ends thereof, an integral raised portion in the center of the pan defining an elevated portion relative to the main bottom of the pan, a glass tube supported on said elevated portion, a wire mesh strainer of a size to loosely fit within said pan, a metal ring attached to the top ends of said legs, a metal cover of a size to removably fit lid-fashion upon said ring; a depending electric light socket attached to the center portion of said cover and extending into the upper portion of said glass tube, electric current wires connected to said socket, and an electric light bulb inserted in said socket.

2. A flying insect trap of the character described comprising, four metal legs having pointed ends adapted for insertion into the ground, a round pan attached to and supported by said legs and spaced upwardly of the said pointed ends, the bottom of the pan having an integral raised center portion, a transparent tube supported on said raised center portion, a light source supported within said tube; a wire mesh strainer of a size to loosely fit within the said pan, a ring made of metal attached to the top ends of the said legs retaining same in fixed positions with relation to each other, and a metal cover of a size to removably fit as a lid upon and over said ring and upper leg ends.

JOE CEIFH SMITH.

REFERENCES CITED

The following references are of record in the file of this patent:

UNITED STATES PATENTS

| Number | Name | Date |
|---|---|---|
| 109,869 | Byrne et al. | Dec. 6, 1870 |
| 473,778 | Puckler | Apr. 26, 1892 |
| 1,019,410 | Baker | Mar. 5, 1912 |
| 1,982,123 | Rittenhouse | Nov. 27, 1934 |
| 2,116,092 | Allen | May 3, 1938 |